US007950630B2

(12) United States Patent
Curien

(10) Patent No.: US 7,950,630 B2
(45) Date of Patent: May 31, 2011

(54) GAS-LIQUID MIXING DEVICE

(75) Inventor: Gerard Curien, Housseras (FR)

(73) Assignee: WINDDROP, Fremifontaine (FR)

( * ) Notice: Subject to any disclaimer, the term of this patent is extended or adjusted under 35 U.S.C. 154(b) by 992 days.

(21) Appl. No.: 11/813,683

(22) PCT Filed: May 31, 2007

(86) PCT No.: PCT/FR2007/051364
§ 371 (c)(1),
(2), (4) Date: Jul. 11, 2007

(87) PCT Pub. No.: WO2007/141448
PCT Pub. Date: Dec. 13, 2007

(65) Prior Publication Data
US 2010/0044891 A1 Feb. 25, 2010

(30) Foreign Application Priority Data

Jun. 2, 2006 (FR) .................................. 06 04955

(51) Int. Cl.
*B01F 3/04* (2006.01)
(52) U.S. Cl. ........... 261/64.5; 261/65; 261/78.2; 261/89
(58) Field of Classification Search ................ 261/64.5, 261/65, 78.2, 84, 89, 109, 116, 119.1; 96/285, 96/323, 349; 55/DIG. 3
See application file for complete search history.

(56) References Cited

U.S. PATENT DOCUMENTS

| | | | |
|---|---|---|---|
| 2,229,083 A | 1/1941 | Hansen et al. | |
| 4,055,405 A * | 10/1977 | Thun-Hohenstein | ........... 96/406 |
| 4,251,241 A | 2/1981 | Bothun | |
| 4,874,404 A * | 10/1989 | Boswell | ........................ 95/151 |
| 5,192,344 A * | 3/1993 | House | ............................. 96/247 |
| 5,520,714 A * | 5/1996 | Muschelknautz | ............... 96/349 |
| 5,752,997 A * | 5/1998 | Roth | ............................... 96/342 |
| 5,776,215 A * | 7/1998 | Amoretti | ......................... 96/247 |
| 5,820,657 A * | 10/1998 | Driker et al. | .................... 95/216 |
| 6,814,788 B2 * | 11/2004 | Barazza et al. | ................ 96/277 |

FOREIGN PATENT DOCUMENTS
EP 0768058 A2 4/1997
EP 0897740 A2 2/1999

OTHER PUBLICATIONS
French Search Report No. 0604955, dated Jan. 23, 2007.
* cited by examiner

*Primary Examiner* — Scott Bushey
(74) *Attorney, Agent, or Firm* — Westerman, Hattori, Daniels & Adrian, LLP

(57) ABSTRACT

This invention relates to a gas-liquid mixing device, forming a safety valve, designed capable of being incorporated into a gas-cleaning installation including a liquid tank (4), an inlet (1) for gas to be cleaned and an outlet (7) through which the gas flow is evacuated. It is characterized in that it has:

- a tube (2) sliding around the gas inlet (1) and including a peripheral float (8) located in its lower end and designed capable of floating in said tank (4), said sliding tube (2) being open in its lower portion, in order to draw liquid from said tank (4) by a venturi effect and to create a mist in a pressure-relief zone (5);
- a mixing chamber (6) interposed between said sliding tube (2) and said outlet (7), and designed capable of conveying the flow of said mist towards the bottom of said tank (4).

18 Claims, 3 Drawing Sheets

GAS-LIQUID MIXING DEVICE

BACKGROUND OF THE INVENTION (1) Field of the Invention

The invention relates to a gas-liquid mixing device, forming a safety valve, designed capable of being incorporated into a gas-cleaning installation including a liquid tank, an inlet for the gas to be cleaned and an outlet through which the gas flow is evacuated.

It also relates to a gas-cleaning installation provided with such a gas-liquid mixing device.

It also relates, in particular, to a vacuum cleaner with water filtering provided with such a gas-liquid mixing device.

The invention relates to the field of the cleaning treatment of gases, in particular air, in industrial or household applications.

Among the latter, the traditional vacuum cleaners with water filtering include a suction device which drives an air flow loaded with debris through a tank containing water. The filtering of the impurities occurs in this water through bubbling, then the air is evacuated towards the outside after passing through a water-air separator system and after passing through the suction block.

The vacuum cleaners with water filtering have several important advantages over the traditional vacuum cleaners having filter bags, or various filters interposed in the gas-circulation circuit, and namely:

Such vacuum cleaners have a constant suction power for a longer period of time, according to the additional filters used, compared to the traditional vacuum cleaners, in which the filter device clogs as the use and filling of the waste-containing bag progresses.

A vacuum cleaner with water filtering can eventually also be without any additional filter to be periodically replaced or cleaned.

A vacuum cleaner with liquid filtering including no bag, the user does therefore not have to buy consumables and the maintenance of the appliance is limited.

The traditional vacuum cleaners do not allow the suction of water and cannot be used for this recovering function.

The use of disinfectant, deodorant or essential oils in the bubbling water of the vacuum cleaner with liquid filtering provides additional functionalities as compared to the traditional vacuum cleaners and in particular the possibility of eliminating acarids.

A vacuum cleaner with water filtering also allows humidifying the air, which can sometimes be desired.

The vacuum cleaners with water filtering allow the cleaning of all floors, carpets, moquettes, textiles, and the like, in the same manner as the traditional vacuum cleaners having filters in the form of bags, cyclone systems, or also specific filters.

(2) Description of the Prior Art

The main technical difficulties met in developing the vacuum cleaners with water filtering is due to the fact that, in a first step, a very intimate mixing must be performed between the air loaded with debris and the water of the vacuum cleaner, then, when said debris are trapped in the water, an as effective as possible separation of the water must be performed, before the passing through the suction module and before the rejection into the atmosphere of the room, in order to remove the droplets in suspension from the gas flow.

Furthermore, the vacuum cleaner must include an overflow safety, in order to avoid, when the vacuum cleaner sucks up water, the complete filling of the tank from driving liquid towards the outlet of the vacuum cleaner. This overflow safety is usually brought about by means of a floating body, often in the form of a ball, enclosed in a cage.

EP 0 768 058 describes such a device, which uses, right from the entering of an air flow loaded with debris, the venturi effect in order to humidify these debris with water contained in a tank, and which includes, on the path of this air loaded with debris and water, before its passing through an air-water separator and suction means, a container provided with such an overflow float. This device has however the drawback of reacting too quickly in an air flow with a high flow-rate, which causes unexpected stoppages of the vacuum cleaner.

SUMMARY OF THE INVENTION

This invention is aimed at optimizing the efficiency of the mixing between a gas loaded with debris and a liquid, in order to improve the efficiency of a gas-cleaning installation, namely a vacuum cleaner, namely with liquid filtering, while providing a safety mechanism that avoids the liquid of the tank from leaving towards the gas suction and the motor when said tank is full.

This invention relates to a gas-liquid mixing device, forming a safety valve, designed capable of being incorporated into a gas-cleaning installation including a liquid tank, an inlet for the gas to be cleaned and an outlet through which the gas flow is evacuated, said device being characterized in that it has:

a tube sliding around the gas inlet including a peripheral float located in its lower end and designed capable of floating in said tank, said sliding tube being open in its lower portion, in order to draw liquid from the tank by a venturi effect and to create a mist in a pressure-relief zone;

a mixing chamber interposed between said sliding tube and said outlet, and designed capable of conveying said mist flow towards the bottom of said tank.

According to a feature of the invention, said mixing chamber is mounted integral with said gas inlet.

According to a feature of the invention, said mixing chamber is movable and mounted integral with said sliding tube.

According to a feature of the invention, said mixing chamber is movable and mounted integral with damping means fixed to said tank or to said outlet, for damping the movement of said mixing chamber under the effect of changes in the gas flow in said gas inlet.

According to a feature of the invention, said outlet consists of a nozzle.

The invention also relates to a gas-cleaning installation including, between an upstream conduit and a downstream conduit, a liquid tank, and at least one such gas-liquid mixing device.

The advantages of the gas-liquid mixing device forming a safety valve according to the invention are multiple:

the venturi effect used and the various variant designs of the mixing device allow an excellent liquid-gas mixing with formation of fine droplets, a significant stirring and thus a good efficiency in separating the debris contained in the gas flow to be cleaned.

one single part, movably mounted, allows performing the gas-liquid mixing and serves as a safety valve for the overflow of the tank.

the device has a reduced size and authorizes high gas flow-rates, which is favorable for the construction of a small-size gas-cleaning installation and an important efficiency.

various configurations are possible for enhancing the liquid-gas mixing and in the same device can be performed the liquid-gas separation, which is absolutely necessary before evacuating to the outside the gas from the gas-cleaning installation, which is then very compact.

Other features and advantages of the invention will become clear from the following description, with reference to the attached drawings, which are given only by way of non-restrictive examples.

DETAILED DESCRIPTION OF THE PREFERRED EMBODIMENTS

The invention relates to the field of the cleaning treatment of gases, namely air, in industrial or household applications.

Figure 1:
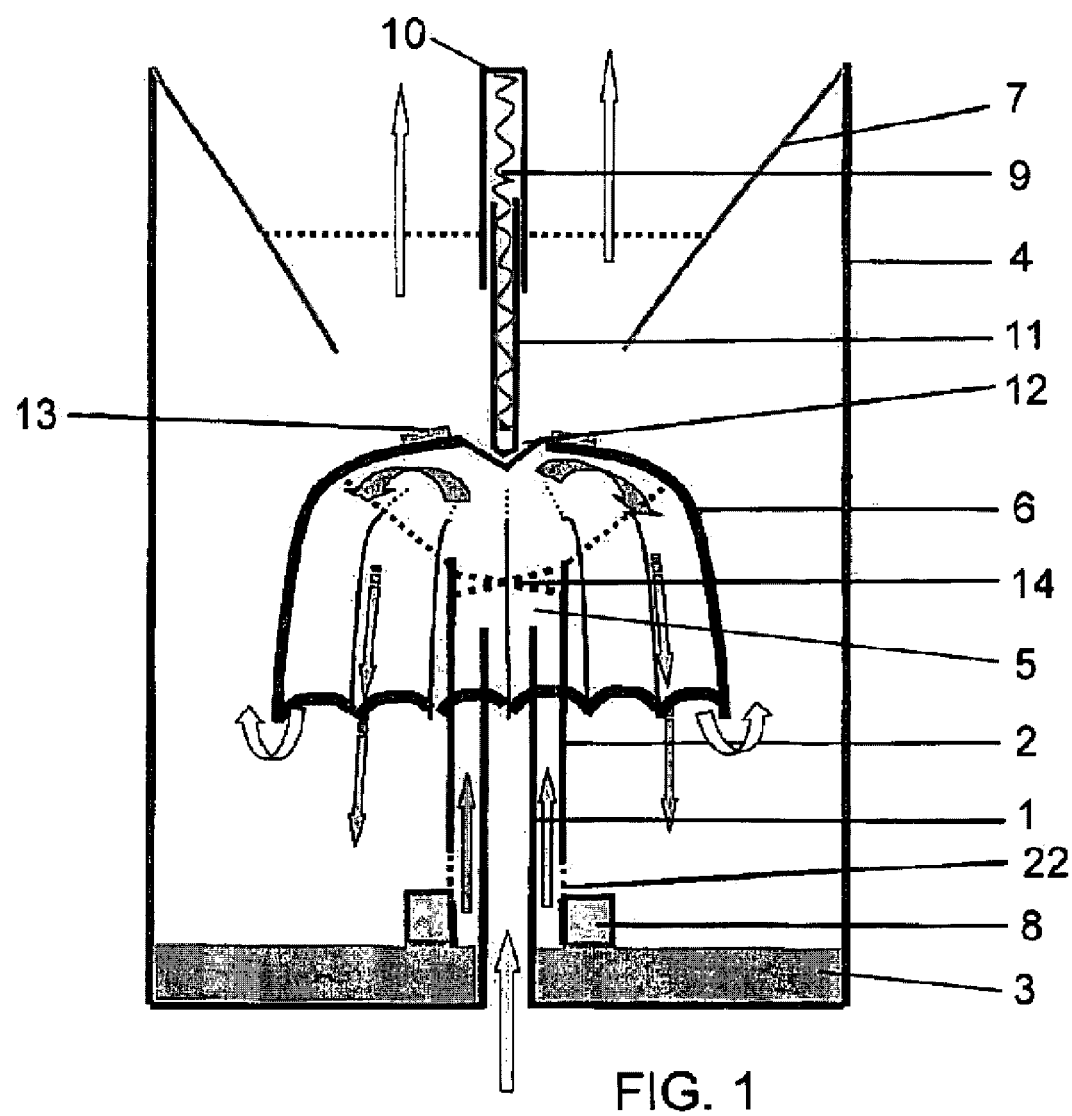
FIG. 1 is a cross-sectional view of a gas-liquid mixing device according to the invention placed in the tank of a gas-cleaning installation, in the example of a vacuum cleaner with water filtering.

A first variant of a gas-liquid mixing device forming a safety valve according to the invention is shown in FIG. 1.

The gas-liquid mixer operates according to the principle of the venturi effect.

A gas flow proceeding from an inlet conduit of a gas-cleaning installation, for example a vacuum cleaner with water filtering at the level of a suction nozzle, arrives in the direction of the arrow at an inlet 1, which has preferably a tubular form. This gas flow generates a negative pressure and a suction in an external tube 2 concentric to the inlet 1; since the tube 2 is into direct contact with the liquid 3 contained in a tank 4, in its lower portion, there occurs a suction of liquid and its ejection in the direction of the gas flow in a pressure-relief zone 5. This tube 2 is sliding around the inlet 1.

A gas-cleaning installation, namely a vacuum cleaner with water filtering, requires a minimum quantity of liquid 3 contained in the tank 4 for the venturi effect to be possible. This effect, known per se, occurs in the device through the mere drawing-in of gas caused by the arriving flow, by differential negative pressure.

A mixing chamber 6 is interposed between the sliding tube 2 and the outlet 7. This mixing chamber 6 is designed capable of conveying the mist flow that was formed in the pressure-relief zone 5 towards the bottom of the tank 4. It preferably includes a concavity oriented towards the bottom of tank 4.

The mixture between the contaminated flow proceeding from the inlet conduit at the level of the inlet 1 and the liquid drawn into the tank 4 occurs in the pressure-relief zone 5 and the mixing chamber 6. At these two locations, the liquid is fragmented into fine droplets and thoroughly mixed with the gas loaded with debris, which debris have been humidified and trapped in the mist formed, they then fall into the tank 4 where they accumulate.

In order for the gas-cleaning device to be as efficient as possible, it is important that the liquid is in the form of very fine drops and that the mixture with gas is propelled as violently as possible.

According to the invention, and as represented in FIG. 1, the gas flow loaded with debris arrives through the inlet 1, passes into the device according to the invention for the gas-liquid mixing, then can be evacuated through an outlet 7, placed in the upper portion of the tank 4. On the gas outlet is generally interposed, between the outlet and the outlet tube, a liquid-gas separator so that liquid does not pass through the motor and is not rejected into the room during the operation of the vacuum cleaner.

In the case of the application to a vacuum cleaner with liquid filtering, the latter is capable of drawing-in all kinds of deposits and liquids, in the latter case of operation, the tank is gradually filled with liquid and it is absolutely necessary to provide for an overflow safety, in order to stop the operation of the vacuum cleaner.

The invention is remarkable in that the overflow safety operates in synergy with the above-described mixing device with venturi effect.

The external tube 2 at the gas inlet 1 is designed slidable and mounted on at least one peripheral float 8, furthermore, the top of the mixing chamber 6 is so shaped that it tightly closes the outlet 7 when said mixing chamber 6 arrives in the upper position. The float 8 is located at the lower end of the tube 2, and is designed capable of floating in the tank 4.

The mixing chamber 6 is designed so as to be capable of opposing the passing through of the gas flow, either through cooperation with the outlet 6 or through cooperation with the tube 2, or through cooperation with both of them.

The tube 2 slides between a lower position corresponding to the float 8 placed on the bottom of the tank 4 and an upper position corresponding to the maximum filling with liquid 3 of the tank 4.

More exactly, in this first variant, the mixing chamber 6 is umbrella-shaped. The mixing chamber 6 can, in a first embodiment, be mounted integral with the gas inlet 1, and therefore fixed. The mixing chamber 6 can, in a second embodiment, also be movably mounted and, in the latter case, preferably be mounted integral with the sliding tube 2. The upward movement of the tube 2 then brings the propelled fluid jet closer, and pushes back the casing of the mixing chamber 6, preferably in the shape of an umbrella, towards the outlet 7. The umbrella-shape the mixing chamber 6 can adopt allows the flow along ribs formed by alternating concavities in the surface of the mixing chamber 6, to facilitate the flow along these ribs.

In the case of another variant in which the mixing chamber 6 is fixed to the tube 1, the floating tube 2 will then close, as the recovered liquid rises, the gas passage by closing it through a contact with the umbrella-shape. This principle is particularly simple, since it allows eliminating the outlet and any tension spring.

In the case in which the mixing chamber 6 is integral with the tube 2, when the appliance draws in liquid and the tank 4 is filled, the float 8 moves upwards and carries with it during its movement the unit formed of the tube 2 and the mixing chamber 6. When the top of the mixing chamber 6 arrives into contact with the lower portion of the outlet 7, the gas flow is stopped and the gas-cleaning installation stops, so that the draining of the tank 4 can be proceeded to.

The casing of the mixing chamber 6, and thus the gas-liquid mixer itself thus form a safety valve for the gas-cleaning installation.

In order for the gas flow not to cause the unexpected blocking of the safety valve, as such occurs with the safety devices with a float, counter-pressure means are provided, which press on the top of the mixing chamber 6.

In the version in which the mixing chamber 6 is movable, the latter is preferably mounted integral with damping means, which are fixed to the tank 4 or the outlet 7, in order to damp the movement of the mixing chamber 6 under the action of changes of the gas flow in the gas inlet 1.

In the variant in which the tube 2 enters into contact with the preferably umbrella-shaped surface of the mixing chamber 6, such a damping device, in particular under the action of springy restoring means, is fixed between the float or floats 8 and the bottom of the appliance. Generally, in an even simpler way, the damping of the jerks associated with the changes in the flow-rate caused by the use of the gas-cleaning installation can be achieved by increasing the weight of the unit formed of the float 8 of a larger volume and the tube 2, without therefore eliminating the floatability of the sliding unit which will then act only in the last instance.

The damping means can be formed by counter-pressure means, which press on the top of the mixing chamber 6. These counter-pressure means preferably consist of pressing means, for example in the form of a spring mechanism, pressing on the top of the mixing chamber 6. Such a mechanism is shown in FIG. 1. The pressing means can be in the form of a spring 9 contained in a receptacle 10 and connected to a movable finger 11 which can move within the receptacle. The force of the spring is sufficient for the float to always remain into contact with the liquid and so adjusted that the rise of the liquid does not generate the immersion of the float 8. Thus, when the tank is filled with liquid, the top of the mixing chamber 6 presses on the movable finger 11 and pushes the latter upwards until the outlet 7 is closed.

The advantageous combination of these various pressure and counter-pressure, floating and tension means is to dampen the jerks of the gas flow-rate due, in the particular case of a vacuum cleaner, to the handling of its ramp, which, after having being been accidentally closed, releases, under the effect of the negative pressure brought about, a large quantity of air that would be capable of causing the closing system to operate due to a too high pressure of the incoming air. This allows the mixing chamber 6 to rise under the action of the float 8 during the filling with liquid of the tank 4.

The movable finger 11 preferably presses in the center of the upper portion of the mixing chamber 6 at a spot 12 configured so that the device remains in place in the tank 4, i.e. substantially on the axis of entering 1 of the gas. Advantageously, this spot 12 is under a negative pressure with respect to the outer surface of the mixing chamber 6.

As a variant, it is possible to connect the movable finger 11 and the mixing chamber 6, in order to form an integral unit.

The casing forming the mixing chamber 6 can be fixed in various ways, with varied retaining means, to the tube 2, without departing from the framework of the invention.

In substitution or in addition to a spring mechanism, which has the advantage of operating to dampen the pressure jerks, it can be contemplated to use counterweights 13 arranged on the outer surface of the mixing chamber 6. Various variants can be imagined for the counterweight 13, for example in the form of one or several applied masses, or also by adjusting the mass of the mixing chamber 6 itself so that the gas pressure and the jerks of the gas flow do not generate an unexpected blocking of this safety.

Advantageously, according to the invention, the lower portion of the tube 2, placed immediately above the float 8, can be provided with holes 22 favoring the adjustment of the suction of liquid and, thus, of the venturi effect. Such holes 22 generate gas entries and thus a reduction of the suction of liquid. One can thus cause the propelling effect of the tube 2, in the direction of the gas flow, to vary, by also causing the ratio between the diameter of this tube 2 and that of the tube 1 to vary. Advantageously, the device according to the invention also includes adjusting means, which are designed capable of variably close these holes 22. These adjusting means can namely consist of a ring mounted on the tube 2, and more or less closing, depending on its angular or longitudinal position, the holes 2, so as to control the flow passing through these holes.

According to the invention, in the pressure-relief zone 5, or in the mixing chamber 6, is advantageously placed a propeller 14 that favors the homogenization of the gas and the liquid. This propeller 14 can be designed fixed and, hence, capable of creating turbulences in the flow, or movable and driven by the gas flow so as to homogenize the mist formed in the pressure-relief zone. The propeller 14 is preferably designed capable of being driven in rotation either by the flow or by motorization means.

In a preferred embodiment, this propeller 14 includes blades having a very concave shape allowing re-concentrating the mist into a liquid element. It is advantageously placed above the sliding tube 2 in the mixing chamber 6.

In substitution or in addition to the propeller 14, it can be contemplated to place in the mixing chamber 6 a brush 17 formed of sets of bristles. The brush 17 is preferably designed capable of being driven in rotation either by the flow or by motorization means, or also and advantageously by a propeller 14 driven by the moving gas flow, or driven by motorization means.

In order to have sufficient room for the propeller and/or the brush, it can be foreseen to modify the exit of the pressure-relief chamber 5, whereby various variants can then be contemplated.

Figure 2:
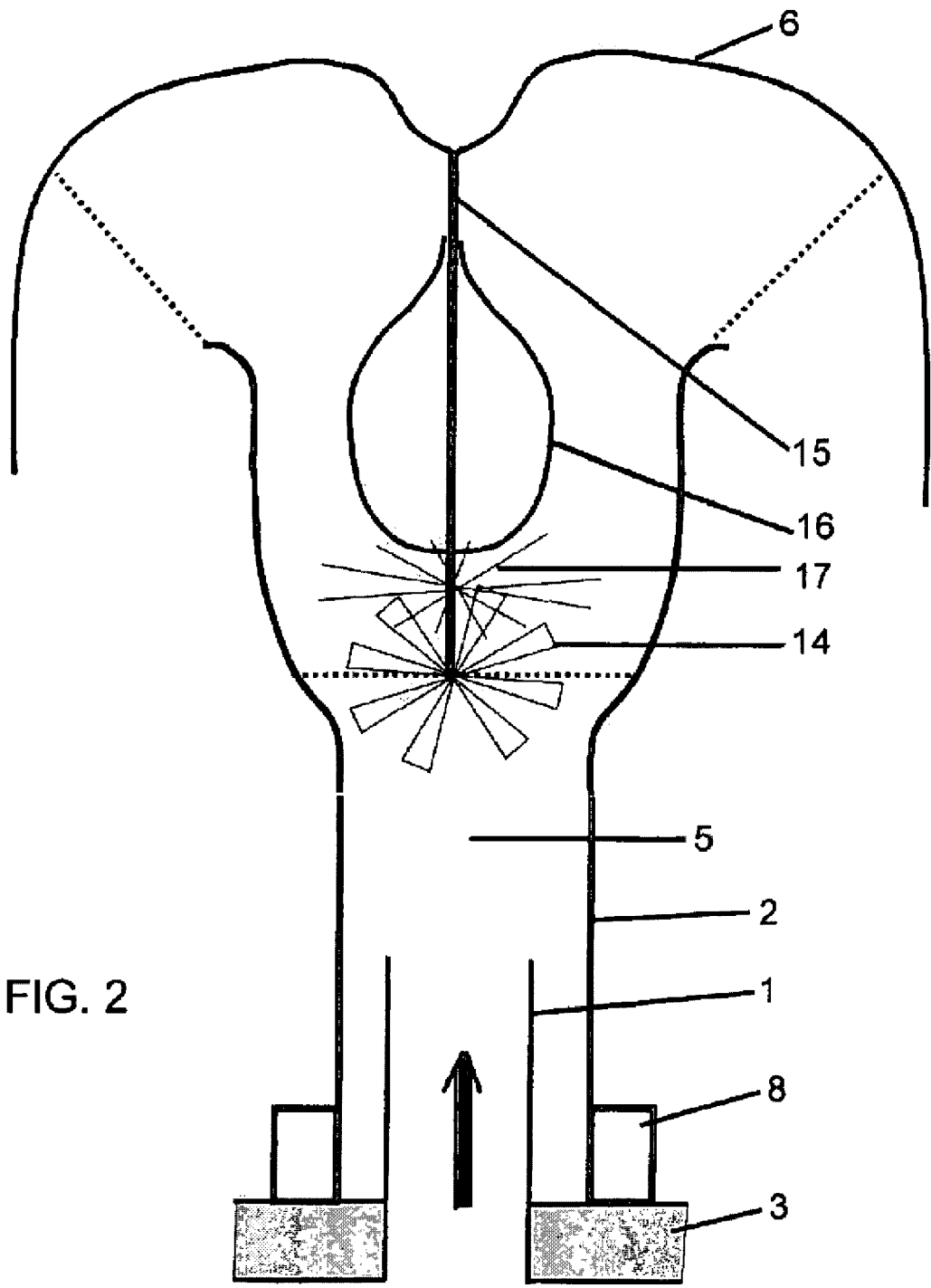
FIG. 2 shows a cross-sectional view of a gas-liquid mixing device according to a second variant of the invention.

FIG. 2 shows a second variant of the invention, in which the outlet of the pressure-relief chamber 5 is provided with a propeller 14 placed in a widening of the tube 2. The propeller 14 is mounted on an axis 15, which authorizes the rotational motion through the driving of the blades in the gas flow.

In order for the gas flow-rate not to be changed and the propeller 14 to efficiently stir the mist proceeding from the pressure-relief chamber 5, it is envisaged to place in the widening of the tube 2 a central core 16, in order to fill the additional volume generated by said widening, with a relatively uniform passage cross-section for the flow. This maintaining of the speed of the air flow thus achieved efficiently allows the rejection of the gas-liquid mixture obtained.

The combination of the propeller and/or the brush with the central core 16 causes a separation of the gas flow, a projection of the droplets towards the peripheral wall of the widened portion of the tube and, hence, a fast liquid-gas separation in the mixing chamber 6.

In order to more effectively centrifuge the mist, it can be envisaged to place above the propeller 14 a flexible brush 17 formed of sets of bristles and driven in rotation, namely by the gas flow, by means of the propeller 14. It should be noted in this respect that, though the driving of a propeller 14 or a brush 17 is advantageously performed under the action of the gas flow, the use of external motorization means can also be contemplated, for example by means of an electric motor.

In the lower portion of the mixing chamber 6, i.e. at the outlet of the pressure-relief zone 5, various variants with only a rotating propeller 14, or maintained fixed, only a brush 17 or a rotating unit of propeller 14 and brush 17 can thus be contemplated. All these possibilities are included in the invention.

Figure 3:
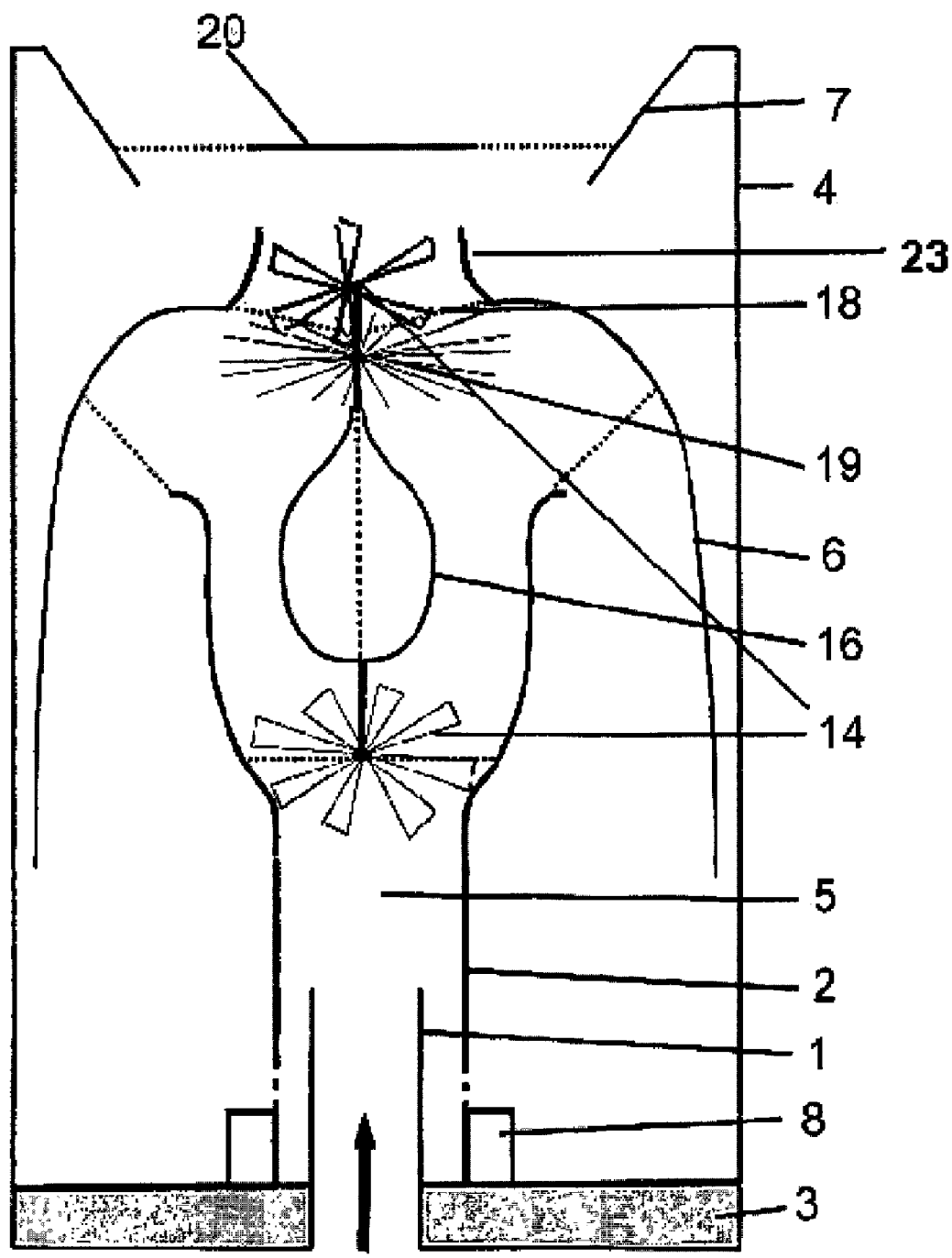
FIG. 3 shows a cross-sectional view of a gas-liquid mixing device placed in the tank of a gas-cleaning installation, in the example of a vacuum cleaner with water filtering, according to a third variant of the invention.

A third variant shown in FIG. 3 consists in modifying the upper portion of the mixing chamber 6 by creating an opening 18 and by placing under it a liquid-gas separating device 19 allowing evacuating the gas, free of liquid, directly into the outlet 7, without passing through the tank 4 and by-passing the mixing chamber 6 as was the case in the preceding variant.

In order for the top of the mixing chamber 6 to act as a safety valve when the tank 4 reaches its maximum level of filling, there is envisaged a configuration of the outlet 7 adapted to close the opening 18, for example through the presence of a disc 20 having the size of the opening. The edges of the mixing chamber 6 press, as in the other variants, on the lower edges of the outlet 7. This configuration of the disc 20 allows, in addition, reducing the suction effect at the level of the outlet 7 by increasing the passage cross-section for the flow of air.

More exactly, in this third variant, a propeller 14 is arranged in the widening of tube 2 and a liquid-gas separator with a brush is placed in the upper portion of the mixing chamber 6 immediately under the opening 18. The upper portion of the mixing chamber 6 is formed so as to cooperate with a fixed portion carried by the outlet 7, in this case a disc 20, allowing closing the gas evacuation when the device arrives in the upper position under the action of the filling with liquid of the tank 4. It is also possible to reverse the relative positions of the propeller 14 and the liquid-gas separator 19, in order to avoid clogging the propeller 14, depending on the nature of the debris conveyed in the gas, and namely in the case of organic debris, hair or the like, through a first separation of soiled gases and liquid at the level of the separator 19, under the action of the centrifugal force during the rotation of the latter. To this end, the propeller 14 is then preferably included in a tubular portion 23 placed above the passage 18, and designed capable of entering into contact with the portion 20.

A gas-liquid mixing device forming a safety valve and including a liquid-gas separating unit, according to this third variant, has the advantage of constituting an extremely compact unit, which is particularly important when used in a household appliance, well-adapted to a filter on a vacuum-cleaner ramp.

Figure 4:
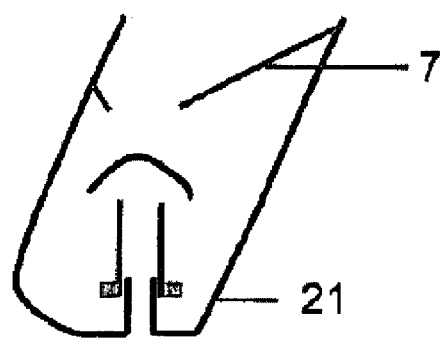
FIG. 4 is a schematic representation of the invention placed in the inclined tank of a vacuum cleaner with water filtering.

The various above-described variants can be configured to be adapted to a vacuum cleaner including an inclined tank. Such a tank 21 is shown in FIG. 4 in a simplified diagram of the device. The lower portion of the tube 1 can be articulated by means of a hose, the vertical positioning being achieved by means of the float or floats 8 of tube 2.

The latter view shows that the gas-liquid mixer forming a safety valve must be arranged as much as possible vertically and that the configuration of the outlet 7 is necessarily adapted for this orientation of the tank.

Various variants of the invention have been described, in addition, other combinations than those mentioned can be contemplated, depending on the presence of counterweights or of a pressing device with a spring and depending on the configuration of the mixing chamber. Said mixing chamber can be formed in various manners for the gas to flow inside same and towards the outside, without departing from the scope of the invention.

The shape of the mixing chamber forming a safety valve and the cutting out of the opening in the outlet allowing obstructing the gas flow when the device arrives in the upper position can be contemplated within a broad range of possibilities, without departing from the scope of the invention. Obviously, the dimensions of the various elements as well as the flow-rates may vary considerably according to the type of gas-cleaning installation, namely vacuum cleaner, considered.

The mixing chamber can be provided with ribs, channels, and generally contact surfaces adapted to favor the condensation of the droplets loaded with debris and the flowing of the latter into the tank.

In the various variants presented, it can be contemplated to place a seal on the lower portion of the outlet or the top of the separating chamber, without departing from the scope of the invention.

Advantageously, the device according to the invention includes means for bringing back the sliding tube 2 to the bottom of the tank 4, for example in the form of a spring or of an elastic strip.

Preferably and as shown in the figures, the outlet 7 is formed by a nozzle.

It should also be noted that this description describes the invention in the form of a gas-liquid mixer. In the particular and common case of the household applications, the gas is air and the liquid is water. The gas-liquid mixer according to the invention is then advantageously made out of materials resistant to corrosion by oxidation.

The invention also relates to any gas cleaning-treatment installation including, between an upstream conduit and a downstream conduit, a liquid tank and at least one such gas-liquid mixing device.

In the particular case of the household applications, this gas-treatment installation consists of a household appliance, namely a vacuum cleaner with water filtering, including means for generating an air flow, and including, between an upstream conduit and a downstream conduit, a water tank and at least one such gas-liquid mixing device.

What is claimed:

1. Gas-liquid mixing device, forming a safety valve, designed capable of being incorporated into a gas-cleaning installation including a liquid tank, an inlet for the gas to be cleaned and an outlet through which the gas flow is evacuated, said device being characterized in that it has:
    a tube sliding around the gas inlet including a peripheral float located in its lower end and designed capable of floating in said tank, said sliding tube being open in its lower portion, in order to draw liquid from said tank by a venturi effect and to create a mist in a pressure-relief zone;
    a mixing chamber interposed between said sliding tube and said outlet, and designed capable of conveying said mist flow towards the bottom of said tank.

2. Gas-liquid mixing device forming a safety valve according to claim 1, wherein said mixing chamber is mounted integral with said gas inlet (1).

3. Gas-liquid mixing device forming a safety valve according to claim 1, wherein said mixing chamber is movable and mounted integral with said sliding tube.

4. Gas-liquid mixing device forming a safety valve according to claim 1, wherein said mixing chamber is movable and mounted integral with damping means fixed to said tank or to said exit, for damping the movement of said mixing chamber under the action of changes of the gas flow in said gas inlet.

5. Gas-liquid mixing device forming a safety valve according to claim 4, wherein said damping means are formed by counter-pressure means, in the form of a spring device, pressing on the top of said mixing chamber.

6. Gas-liquid mixing device forming a safety valve according to claim 1, wherein the tube slides between a lower position corresponding to the bottom of the tank and an upper position corresponding to the maximum filling with liquid of the tank.

7. Gas-liquid mixing device forming a safety valve according to claim 1, wherein the top of said mixing chamber is formed so as to tightly close said outlet when said mixing chamber arrives in the upper position.

8. Gas-liquid mixing device forming a safety valve according to claim 1, wherein the mixing chamber includes at least one propeller, designed capable of being driven in rotation.

9. Gas-liquid mixing device forming a safety valve according to claim 1, wherein the mixing chamber includes at least one brush provided with bristles, designed capable of being driven in rotation.

10. Gas-liquid mixing device forming a safety valve according to claim 1, wherein the upper portion of the tube is widened so as to allow placing at that location a propeller and/or a brush and in which a core is arranged in said widened portion, which allows a separation of the gas flow without loss of flow-rate.

11. Gas-liquid mixing device according to claim 1, wherein it includes means for bringing back said sliding tube towards the bottom of said tank.

12. Gas-liquid mixing device forming a safety valve according to claim 1, wherein it includes adjusting means designed capable of variably closing holes said sliding tube includes, in its lower portion and above said float.

13. Gas-liquid mixing device forming a safety valve according to claim 1, wherein said mixing chamber is designed capable of cooperating with said outlet in order to oppose the passage of gas.

14. Gas-liquid mixing device forming a safety valve according to claim 1, wherein said mixing chamber is designed capable of cooperating with said sliding tube in order to oppose the passage of gas.

15. Gas-liquid mixing device forming a safety valve according to claim 1, wherein said mixing chamber is umbrella-shaped.

16. Gas-liquid mixing device forming a safety valve according to claim 1, wherein said outlet is formed by a nozzle.

17. Gas-cleaning installation, including, between an upstream conduit and a downstream conduit, a liquid tank, and at least one gas-liquid mixing device according to claim 1.

18. Vacuum-cleaner with water filtering, including means for generating an air flow, and including, between an upstream conduit and a downstream conduit, a water tank, and at least one gas-liquid mixing device according to claim 1.

* * * * *